June 5, 1951 — O. E. ESVAL ET AL — 2,555,328
GREAT CIRCLE DIRECTION-KEEPING INSTRUMENT
Filed Jan. 6, 1944 — 3 Sheets-Sheet 1

INVENTORS
ORLAND E. ESVAL
WALTER WRIGLEY
BY
Herbert H. Thompson
ATTORNEY.

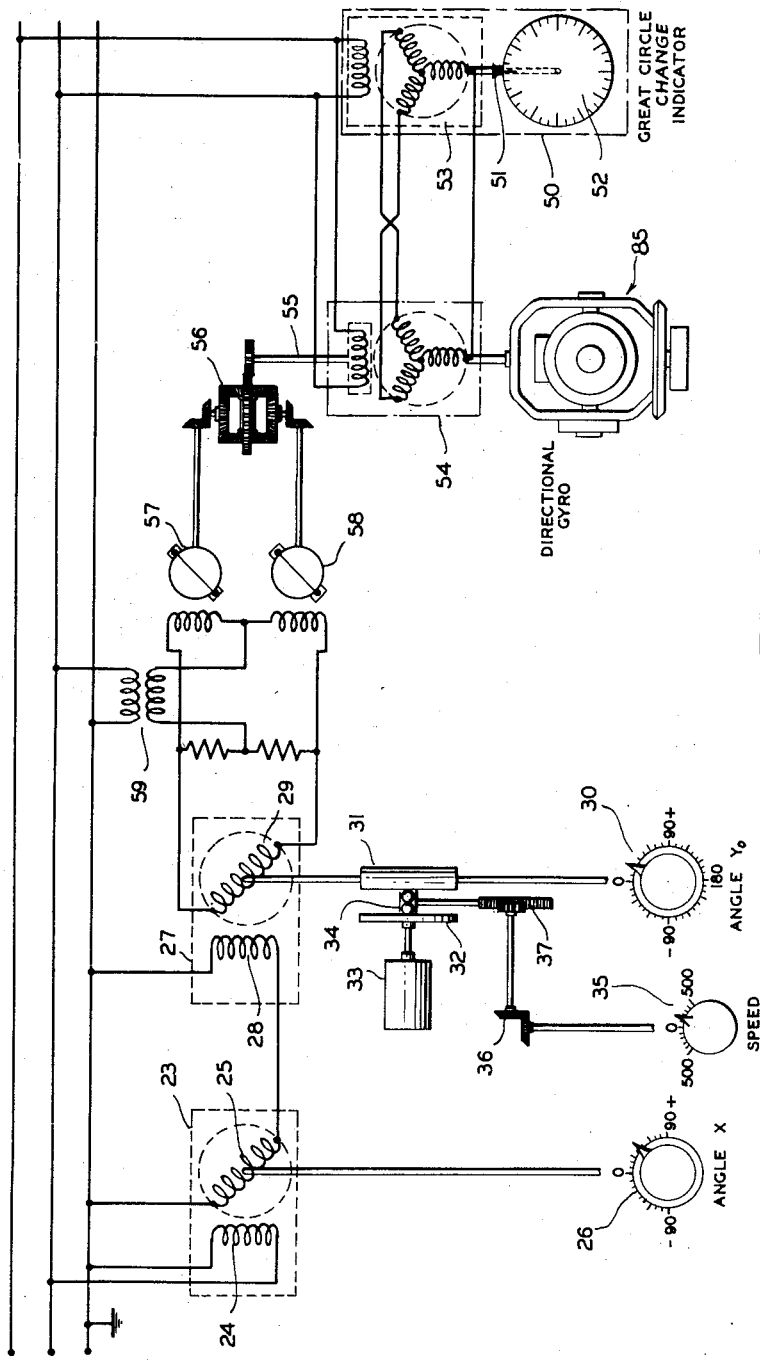

Patented June 5, 1951

2,555,328

UNITED STATES PATENT OFFICE 2,555,328

GREAT CIRCLE DIRECTION-KEEPING INSTRUMENT

Orland E. Esval, Huntington, and Walter Wrigley, East Hempstead, N. Y., assignors to The Sperry Corporation, a corporation of Delaware Application January 6, 1944, Serial No. 517,214

19 Claims. (Cl. 33—204)

This invention relates to means for steering a dirigible craft along a great circle track and provides an instrument which gives a constant indication so long as the predetermined great circle is followed whereas the true compass course in general will continually change as the craft proceeds.

As employed herein, a great circle is defined as a circle on the earth's surface whose plane passes through the center of the earth. Also, a great circle track is defined as the route between any two places along a great circle passing through both places.

In one form of the invention the improved instrument includes a directional gyro that is controlled about its azimuth axis to provide an apparently constant indication of the heading of the craft. In this form of instrument a levelling torque exerting means is employed that is effective about the azimuth axis of the gyro to balance the effect on the instrument of the horizontal component of the earth's rotation. The means illustrated in the drawings of the present case to perform this function are of conventional form. Means may also be provided to cause the gyro to precess about its azimuth axis. In accordance with the teaching of the invention the effectiveness of the control about the azimuth axis of this form of the improved instrument is varied with the sine of the latitude of the craft to cancel automatically the effect on the instrument of the component of the earth's rotation round the local vertical.

An indicator such as a graduated card that is given an absolute rotation round a vertical axis equal to the component of the earth's rotation round the same axis, and has no other absolute rotation about that axis, provides an apparently constant indication of direction as the craft in which it is carried follows a great circle track.

According to our invention the indicator takes the form of a card which is carried by or driven by an automatically levelled directional gyro and the rotation about the vertical axis, equal to the component of the earth's rotation about the vertical, is imparted either by causing the gyroscope to precess in azimuth at the required rate and so rotate the card, or by leaving the gyro undisturbed and causing the card indicator to be rotated in azimuth relatively to the gyro at the required rate. A preferred method of introducing this rotation to the card alone is to employ an electrical transmission between the gyro and the card and to include an electrical differential in the transmission whereby the earth rate rotation can be introduced. By the use of an instrument of this character, the pilot may control his craft to maintain the reading thereon constant and thus traverse a great circle course.

Other features and details of the invention will be apparent from the following description when read in relation to the accompanying drawings wherein Fig. 1 is a front elevation of an instrument constructed in accordance with the present invention;

Fig. 5 is a schematic view showing a modified form of the invention.

Figure 1:
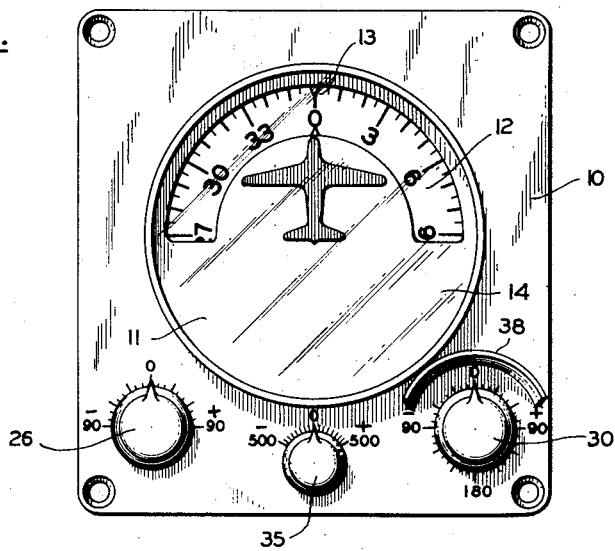
Figure 2:
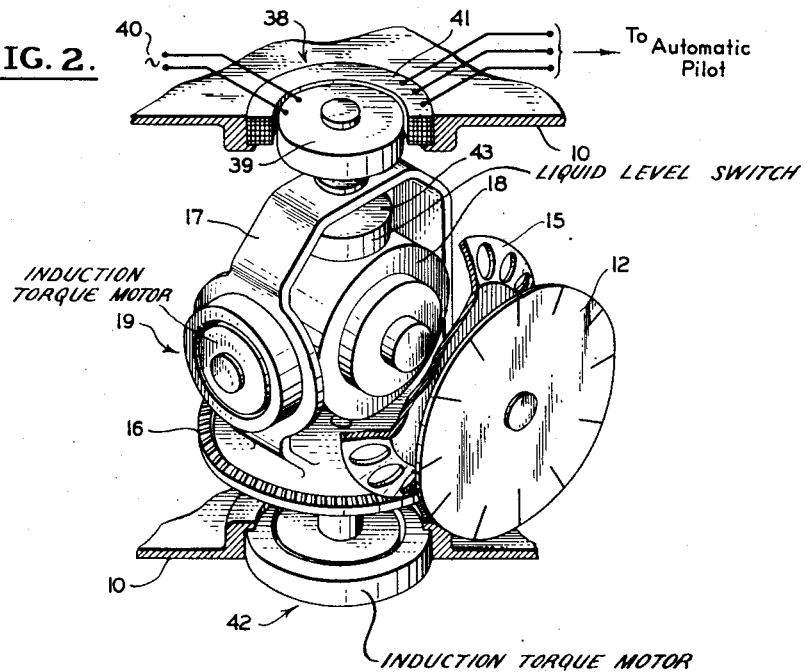
Fig. 2 is a detailed perspective view of the gyroscopic portion of the instrument shown in Fig. 1.

With reference to the form of the invention shown in Figs. 1 and 2, the improved instrument is shown to include a casing 10 that encloses the gyroscopic parts thereof. The front wall of the casing 10 has a window 11 through which an observer views an indicating card 12. This card is illustrated in the form of a compass card for convenience only, it being understood that the instrument does not provide any indication of the heading of the craft on which it is employed. The card 12 is viewed, in this instance, with reference to a lubber line 13 located on a mask 14 that is situated to the rear of the window 11. The mask is fixed to the casing 10 and has an opening therein to permit the observer to view the card 12. The card and line provide relatively movable index and reference members by which continued movement of the craft on a great circle course is indicated. In use, a particular numeral on the card of the instrument is maintained in the same position with regard to its index to insure that the craft is following a great circle course. The numerals per se on the card have no special significance in the instrument. When the hereinafter described latitude correcting means is disabled the instrument is then free to be used as a conventional directional gyro. For this reason, the instrument has been shown with a conventional form of compass card.

Card 12 may be rotatably mounted for movement about a horizontal axis in the casing 10 by means of suitable bearings (not shown) and may be controlled by a crown gear 15 that meshes with a bevel gear 16 situated at the base of the vertical ring 17 of the directional or azimuth gyro. The vertical ring is pivotally mounted within the casing 10 by means of suitable bearings (not shown) to define the azimuth axis of the gyro part of the instrument. The azimuth position of the ring 17 of the gyro consequently determines the relation between the card 12 and the fixed lubber line 13.

The present instrument further includes a conventional rotor bearing case 18 mounted for pivotal movement on the vertical ring 17 about a horizontal axis by means of suitable bearings (not shown). The axes of the ring and case are mutually perpendicular. The gyro rotor (not shown) is mounted to spin about a normally horizontal axis within the case 18, the spin axis of the rotor being perpendicular to both the axes of case and ring as in conventional directional or azimuth gyro construction. The gyro rotor is spun by suitable means (not shown).

Figure 4:
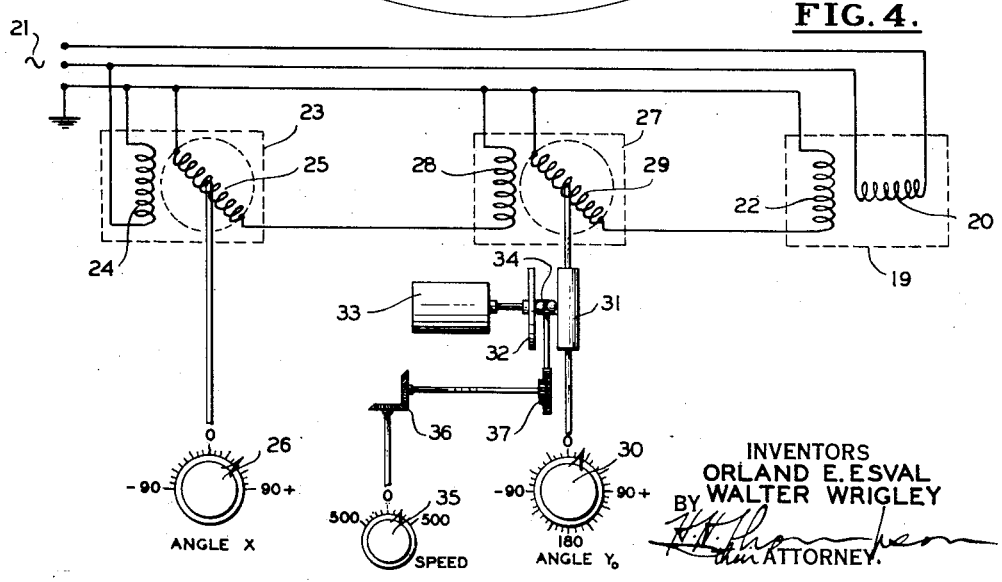
Fig. 4 is a wiring diagram and schematic view of the controlling means employed in the present instance to obtain a signal proportional to the sine of the latitude of the craft.

Means are shown in Fig. 2 to control the gyro about its azimuth or vertical axis, the axis of ring 17, in the form of an induction torque motor generally indicated at 19. This motor is effective to exert a torque about the horizontal axis of the case 18 to precess the vertical ring 17 and move the card 12. As shown, the polyphase wound stator of the motor 19 is fixed to the vertical ring and the rotor of the motor is fixed to one of the extending trunnions of the case 18, these parts being coaxial with the horizontal axis of the case and being relatively movable. As shown in Fig. 4, winding 20 of the torque motor 19 is continuously supplied with energy from a suitable source of alternating current electrical energy indicated at 21. The control winding 22 of the torque motor 19 is energized in a manner hereinafter described in detail.

The gyro of the improved instrument may be levelled in a suitable manner by means of a torque motor generally indicated at 42 that is effective about the axis of the ring 17 to precess the case and maintain the spin axis of the gyro rotor in a horizontal plane. Motor 42 which is similar to the described motor 19, is controlled by a tilt detecting device such as a liquid level switch 43 that is mounted on the case 18. Switch 43 may be of the type shown in U. S. Letters Patent No. 2,376,377, issued May 22, 1945, to John R. Muma, Elwood J. Wilson, Jr., and Robert Haskins, Jr. Motor 42 exerts a torque effective about the azimuth axis of the gyro to balance the effect on the instrument of the horizontal component of the earth's rotation. This component of the earth's rotation is effective at any latitude of the craft to tilt the case 18 about its horizontal axis on the ring 17. The switch 43 is then effective to control the motor 42 to restore the case to a properly levelled position. This control is conventional in directional gyro instruments and is employed in the present instrument to prevent the indication of the card or reference member 12 from being influenced by the horizontal component of the earth's rotation.

Figure 3:
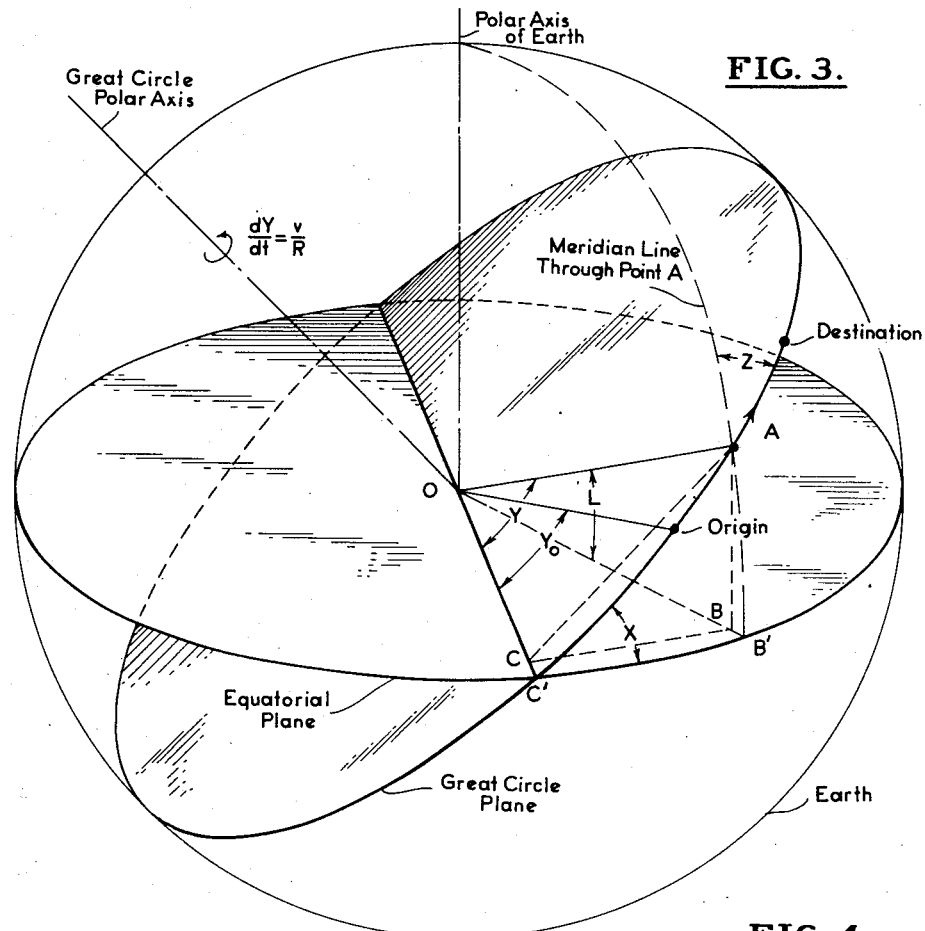
Fig. 3 is a view illustrating a great circle coordinate system.

The coordinate system represented in Fig. 3 shows the earth, the polar axis of the earth, the equatorial plane of the earth, a great circle plane and the polar axis of the great circle plane. The great circle shown was arbitrarily selected for purposes of illustration, it being assumed that the craft on which the presently described type of instrument is employed is to traverse a great circle track starting at the origin point and finishing at the destination point. These points are correspondingly designated in Fig. 3 with a great circle connecting the same. A particular point A is also shown on this great circle to indicate the present position of the craft in following the great circle course or track. A meridian line through point A is also shown. The dihedral angle between the great circle plane and equatorial plane is indicated by the reference X. The angular displacement of point A along the great circle measured from the intersection of the great circle and the equatorial plane is designated by the reference Y. $Y_0$ is the corresponding angle for the point of origin of the selected course. Angle Z is the angle at point A between the meridian line and the great circle, this angle representing the heading of the craft at the point A. Generally, the angle Z changes continuously as the craft moves along the great circle track. The angular velocity of motion of the craft traversing the great circle track is represented by the arrow about the great circle polar axis and is expressed as the ratio $dy/dt$ where Y is the angle noted and $t$ is time.

The rate of change relative to the meridians of heading of the craft traversing the selected great circle track at point A may be expressed mathematically as follows:

$$(1) \qquad \frac{dZ}{dt} = -\frac{\sin X \cos X \sin Y}{1 - \sin^2 X \sin^2 Y} \cdot \frac{dY}{dt}$$

These values are particularly noted in Fig. 3 of the drawing, the same being hereinbefore considered in detail.

The apparent residual rate of drift $$\frac{dr}{dt}$$

of a continuously levelled free directional or azimuth gyro after compensation for the effect of the vertical component of the earth's rotation, may be expressed mathematically in the following manner:

$$(2) \qquad \frac{dr}{dt} = \frac{v \sin Z \tan L}{R}$$

where $r$ is the azimuth angle of the gyro axle, $v$ is the velocity of the moving craft, L is the latitude of the craft at point A, and R is the radius of the earth. When converted to great circle coordinates the drift rate of a gyro instrument of this character about its azimuth axis may be mathematically represented as follows:

$$(3) \qquad \frac{dr}{dt} = -\frac{\sin X \cos X \sin Y}{1 - \sin^2 X \sin^2 Y} \cdot \frac{dY}{dt}$$

Since the right-hand terms of Equations 1 and 3 are identical, it follows that the rate of apparent movement of the gyro about its azimuth axis, or rate of change of position of card 12 with reference to lubber line 13, after compensation for the earth-rate, either by precession of the gyro or by turning of the card relatively to the gyro, will be the same as the rate of change in heading Z of the craft as the same follows a great circle track. This results in an apparently constant or fixed reading at the face of the improved instrument, the card 12 apparently remaining in the same position relative to lubber line 13 at all times when the craft follows a great circle track. To obtain this result and produce a great circle track indicating instrument of the type described, the gyro or card thereof must be controlled about its azimuth axis to balance out exactly the effect thereon of the vertical component of the earth's rotation at any position on the earth.

The vertical component of the earth's rotation changes as the sine of the latitude of the craft. Along a great circle course the latitude will be a function of several variables including the travel time of the craft from the point of origin. When expressed in great circle coordinates this latitude function becomes relatively simple and may be represented by the equation:

$$\sin L = \sin X \sin Y$$

With reference to Fig. 3 the above equation is derived in the following manner. The sine of the latitude at point A, see triangle OAB, is represented by the distance AB with the radius of the earth assumed as unity. In right triangle CAB, the sine of angle X is $AB/AC$ and in right triangle OAC, the sine of angle Y is AC, the radius of the earth again being unity. The product of these values is the same as the direct sine of the latitude at point A on the earth's surface. The same relation may be derived directly from the laws of a right spherical triangle AC'B'.

Inasmuch as the angle X does not change for a given great circle course, the sine thereof is constant. The angle Y is a linear function of the time of travel as the craft traverses the great circle track and may be mathematically expressed as follows:

$$Y = Y_0 + \frac{v}{R} t$$

where $Y_0$ is the initial angular displacement along the great circle of the point of origin of the track, $v$ is the speed of the craft, R the radius of the earth and $t$ the time elapsed after departure of the craft from the point of origin on the great circle.

To determine the values X and $Y_0$ for a particular track a globe having a great circle arm and a polar protractor may be employed, or the values may be mathematically computed by the usual methods of navigation.

The effectiveness of the control means is varied in proportion to the sine of the latitude of the craft to balance the effect on the instrument of the vertical component of the earth's rotation. This means includes the azimuth precessing torque motor 19, in the present instance, the same being operable to vary the torque produced by the same with change in latitude and to control precession of the gyro in azimuth at a rate that is equal to the rate of change of heading of the craft on which the instrument is employed.

As shown in Fig. 4, the control means includes a variable coupling transformer indicated at 23, whose stator winding 24 is energized from the source 21. The rotor winding 25 of this transformer is positioned by a control knob 26 (Fig. 1) that is settable with a scale on the face of the instrument in accordance with the angle X as obtained by means such as the globe hereinbefore mentioned. The sinusoidal voltage output of the transformer 25 is regulated in accordance with the sine of the angle X. Once set the knob 26 remains in a fixed position for a given great circle track.

The output of transformer 23 is fed to a second variable coupling transformer indicated at 27 (Fig. 4), the stator winding of which is designated at 28. The rotor winding 29 of the transformer 27 is initially positioned by a knob 30 (Fig. 1) that is settable with a scale located on the face of the instrument. Winding 29 is initially set in accordance with the predetermined angle $Y_0$ obtained by means of the hereinbefore mentioned globe. After setting the knob 30, the rotor 29 of the transformer is preferably rotated in proportion to the speed of the craft relative to the earth which may be determined in any manner now known in the art. As shown in the drawing, the rotor 29 is rotated by a variable speed mechanism comprising a cylinder 31, a disc 32, rotated at a constant speed by a constant speed motor 33, and a radially movable ball carriage 34 that may be displaced in accordance with the ground speed of the craft. In the present instance, the carriage is positioned by means of a control knob 35 through bevel gears 36 and rack and pinion 37. Knob 35 extends through the front wall of the instrument and is set in accordance with the ground speed, in this instance, relative to a suitable scale appearing on the face of the instrument. A shield 38 may be employed to cover the knob 30 as the same continuously rotates when the instrument is in operation.

The combined transformers 23 and 27, as controlled by knobs 26, 30 and 35 produce a voltage output proportional to the sine of the latitude of the craft. This control voltage is fed to the winding 22 of the torque motor 19 and the directional gyro portion of the instrument is caused to precess continuously about its azimuth axis to balance the effect thereon of the changing value of the vertical component of the earth's rotation at all times.

As shown in Fig. 2, the improved instrument may be employed to control an automatic pilot to guide the craft along a great circle track. In this connection, a pick-off detecting displacement about the azimuth axis of the instrument is employed, the same being shown in the present instance as a variable coupling transformer 38 whose wound rotor 39 is continuously supplied with energy from alternating current source 40. The wound stator 41 of this transformer is fixed to the casing 10 of the improved great circle track indicating instrument. The voltage output of the stator 41 is fed to an automatic pilot that changes the heading of the craft at the same rate that the vertical ring 17 of the instrument precesses in azimuth. Consequently, the craft follows the great circle track determined for the same by the setting of the control dials 26, 30 and 35. Data for setting the control dials of the instrument is obtained by standard dead-reckoning navigational procedure for ground speed and crab angle. If at any time a definite position fix for the craft is obtained, a new great circle course may be set in using this fixed position as a new origin.

In the modified form of the instrument shown in Fig. 5 of the drawings, the secondary winding 29 of the variable coupling transformer 27 generates as before an A. C. voltage proportional to the sine of the latitude of the craft. This voltage is applied to the field windings of two repulsion motors 57 and 58. Motors 57 and 58 have their rotor windings short-circuited by fixed brushes and, as is well known, when supplied with alternating current they will run at a speed substantially proportional to the voltage supplied. In the present instance, the supply to the stators of the motors 57 and 58 is derived from two sources. One source is a transformer 59 which of itself, by reason of the center tapped arrangement for the output thereof, causes the motors 57 and 58 to run at constant and equal speeds but in opposite directions. The second source of supply to the motors 57 and 58 is the winding 29 which, as already stated, gives a voltage proportional to a function of the latitude, and of itself would cause motors 57 and 58 to run in the same direction and at equal speeds, the speed and direction depending on a function of the latitude. These two motors drive through a bevel gear differential 56 to shaft 55, the arrangement being such that if the motors are energized from transformer 59 alone and run at the equal speeds in opposite directions, shaft 55 will not turn. When, however, there is a signal from coil 29, this reinforces the voltage in the winding of one of the motors and weakens the voltage in the winding of the other. Consequently, motors 57 and 58 run at unequal speeds and shaft 55 rotates at a speed which is proportional to the rate of change of the sine of the latitude.

As represented in Fig. 5, a gyroscopic instrument of the conventional directional-gyro type indicated at 85 carries on its vertical ring the rotor of a variable coupling transformer 54. When the gyro 85 moves in azimuth relatively to the craft, the ring moves the rotor of the transformer 54 and causes the rotor of the variable coupling transformer 53 to turn through the same angle. The stators of transformers 53 and 54 are fed in parallel by single phase current from source 21. The stator of transformer 54 is mounted on shaft 55 so as to be turned by the differential 56 at a rate corresponding to the sine of the latitude. Consequently, the output of transformer 54 and the rotation given to the rotor of transformer 53 is a combination of the azimuthal movement of the gyro 85 relatively to the craft and the shaft 55. It therefore follows that a fixed index member 51 on the face of a great circle course indicator 50 shows any departure from the great circle course or track to be followed by changes in the reading of the card 52 which is graduated in degrees and rotated by the rotor of transformer 53. Card 52 provides the reference member of the direction keeping instrument.

With this type of instrument, the signal output of the transmitter 54 is proportional to the difference between the movements of the stator and rotor parts thereof. As long as a great circle track is followed this difference will be zero and the card 52 will consequently remain stationary. If the reference card 52 moves, the pilot changes the heading of the craft to restore the card to the original reading and thus maintain the craft on the desired great circle course.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A great circle course indicating instrument, for dirigible craft including a movable indicator, an automatically levelled directional gyro movable about its vertical axis to control said indicator, means for precessing said gyro about its vertical axis, and automatically operable means dependent on initial settings of course and speed for varying the torque produced by said precessing means in accordance with the sine of the latitude of the craft to balance the effect on the instrument of the vertical component of the earth's rotation.

2. In a great circle course indicating instrument for dirigible craft, a course indicator, an automatically levelled directional gyro movable about its azimuth axis to control said indicator, torque exerting means for precessing said gyro in azimuth, and means for operating said precessing means to cause said gyro to move about its azimuth axis at a rate equal to the component of the earth's rotation about the local vertical whereby said gyro axle will maintain a constant orientation with respect to a great circle track pursued by the craft.

3. A great circle course indicating instrument for dirigible craft including course indicating relatively movable index and reference members, an automatically levelled directional gyro movable about its azimuth axis to control the relative movement of said members, electrical torque exerting means effective to precess said gyro about its azimuth axis, means for producing an electrical signal proportional to the sine of the latitude of the craft, and means for controlling said electrical torque exerting means from the output of said signal-producing means.

4. An instrument as claimed in claim 3, in which said signal producing means includes a pair of interconnected variable coupling transformers, the rotor of the first of which is positioned in accordance with the dihedral angle between the great circle plane and equatorial plane in the noted great circle coordinate system, and the rotor of the second of which is initially positioned in accordance with the angular displacement of the origin point of the craft along the great circle measured from the intersection of the great circle and equatorial planes and rotated at a speed proportional to the speed of the craft.

5. A great circle course change indicating instrument for dirigible craft including relatively movable index and reference members, an automatically levelled directional gyro pivoted in a ring movable about a vertical axis subject to an error due to the vertical component of the earth's rotation, means for connecting said ring to one of said members, and means operable through said connecting means for imparting to said member a component of relative rotation equal and opposite to the aforesaid component of the earth's rotation about the local vertical, whereby said member tends to have a fixed orientation as long as the craft follows a predetermined great circle track.

6. A great circle course indicating instrument for dirigible craft including relatively movable index and reference members, means for operating one of said members including a two part variable coupling transformer, an automatically levelled directional gyro having a vertical ring connected to operate one part of said transformer, motive means for operating the other part of said transformer, and means for controlling the speed of operation of said motive means in proportion to the sine of the latitude of the craft.

7. An instrument for use in steering a great circle track in dirigible craft comprising an automatically levelled neutral gyroscope gimballed for freedom in elevation and azimuth, a rotatable reference member driven by the gimbal ring of said gyroscope and means for correcting the position of said member by an amount equal to the component of the earth's rotation about the local vertical whereby, neglecting friction and the like, changes in the position of said member will be equal to the changes in the compass heading of the craft as it pursues a predetermined great circle track.

8. An instrument as claimed in claim 7, in which said correcting means includes a variable coupling transformer having two parts, a connection between one of the parts of said transformer and said ring, and motive means for moving the other part of said transformer at a speed proportional to the sine of the latitude of the craft.

9. An instrument for use in steering a great circle track in dirigible craft comprising an automatically levelled neutral gyroscope gimballed for freedom in elevation and azimuth, a movable reference member driven by the gimbal ring of said gyroscope, means for applying a couple round the horizontal axis of said gyroscope so as to cause it to precess in azimuth at a predetermined rate and means for controlling the magnitude of said couple so that the rate of precession of the gyroscope produced by said couple shall be equal and opposite to the component of the earth's rotation round the local vertical whereby said member will tend to have a fixed orientation as long as a great circle track is followed.

10. An instrument for use in steering a great circle track in dirigible craft comprising an automatically levelled neutral gyroscope gimballed for free precession in elevation and azimuth, a movable reference member driven by the gimbal ring of said gyroscope and means for displacing said member angularly with respect to said gyro at a rate equal to the component of the earth's rotation about the local vertical whereby changes in the position of said member will be equal to the changes in the compass heading of the craft as it pursues a predetermined great circle track.

11. An instrument for use in dirigible craft to indicate changes of course necessary to follow a great circle including a reference member movable with respect to a fixed index, an automatically levelled directional gyro operatively connected to said reference member, means for causing said gyro to precess about its vertical axis, means for manually adjusting the effectiveness of said precessing means according to the initial latitude and automatic means for subsequently varying the adjustment of the effectiveness at a rate corresponding to the calculated rate of change of the sine of the latitude.

12. An instrument for indicating changes in compass course required for a dirigible craft to pursue a great circle track including a movable reference member, an automatically levelled directional gyro movable about its azimuth axis to control the movement of said member, electrical torque exerting means effective to cause precession of said gyro about its azimuth axis, means for producing an electrical signal proportional to the sine of the latitude of the craft and means for controlling said electrical torque exerting means from the output of said signal producing means.

13. An instrument for indicating changes in course required for a dirigible craft to pursue a great circle track including a movable reference member, an automatically levelled directional gyro movable relatively to the craft about its azimuth axis to control the movement of said member, means for producing an electrical signal proportional to the sine of the latitude of the craft and electrical differential means for displacing said member relative to said gyro from the output of said signal producing means.

14. An instrument as claimed in claim 3 in which said signal producing means includes a variably coupled transformer one winding of which is manually rotated in accordance with the angular displacement of the initial location of the craft from the equator measured along the great circle through said initial location and the point of destination so that a signal is induced in the secondary winding proportional to the sine of said angle and a second variably coupled transformer in circuit with said first-named transformer and adapted to be positioned in accordance with the tilt angle between the equatorial plane and the plane of said great circle.

15. An instrument for use in steering a great circle track in dirigible craft including relatively movable index and reference members, an automatically levelled directional gyro operatively connected to one of said members, variable means for causing said gyro to precess about its vertical axis and automatically operable means for varying the strength of said precessing means as the latitude of the craft changes, means for computing such latitude changes from the speed and angular functions of the great circle course of the craft, and introducing the same in said varying means so as to balance the effect on the instrument of the vertical component of the earth's rotation, whereby, neglecting friction or the like, said member will maintain a fixed orientation with respect to the plane of a great circle along which the craft travels.

16. An instrument for indicating changes in the course required for a dirigible craft to pursue a great circle track including a movable reference member, an automatically levelled directional gyro movable about its azimuth axis to control the movement of said member, means for producing an electrical signal according to a function of the changing latitude of the craft and, means for causing a corrective rotation of said reference member from the output of said signal producing means.

17. An instrument for use in steerable craft to give a constant indication of the direction of a great circle track along which said craft is to be steered comprising an automatically levelled neutrally balanced gyroscope gimballed for freedom in elevation and azimuth, a movable reference member stabilized in azimuth by said gyroscope and means for modifying the stabilization of said member by adding a corrective rotation at a rate equal to the component of the earth's rotation round the local vertical whereby the correction in the orientation of said member will be equal to the changes in the compass heading of the craft as it pursues the desired great circle track.

18. In a great circle course indicating instrument for dirigible craft, the combination of relatively movable course indicating index and reference members, an automatically levelled directional gyro movable about its azimuth axis to control the relative movement of said members, means for correcting the movement of one of said members, and means for causing said correcting means to operate at a rate equal to the component of the earth's rotation about the local vertical whereby said member will maintain a constant orientation with respect to a great circle track pursued by the craft.

19. In an instrument as claimed in claim 13, in which said signal producing means includes a means for varying said signal as the craft travels along a great circle course comprising a variably coupled transformer, one part of which is rotatable in accordance with the angular displacement of the initial location of the craft from the equator measured along a predetermined great circle through said point and the destination, so that a signal is produced therein proportional to the sine of said angle, and a variable speed drive connected to said part to additionally rotate the same at a speed proportional to the speed of the craft along said great circle, whereby the signal developed by said transformer will be continually maintained proportionate to the sine of the present angular displacement.

ORLAND E. ESVAL.
WALTER WRIGLEY.

REFERENCES CITED

The following references are of record in the file of this patent:

UNITED STATES PATENTS

| Number | Name | Date |
| --- | --- | --- |
| 1,390,471 | Sundhausen | Sept. 13, 1921 |
| 1,982,635 | Carlson et al. | Dec. 4, 1934 |
| 2,099,705 | Reichel | Nov. 23, 1937 |
| 2,242,233 | Carlson et al. | May 20, 1941 |
| 2,406,341 | Beach et al. | Aug. 27, 1946 |

FOREIGN PATENTS

| Number | Country | Date |
| --- | --- | --- |
| 872,182 | France | Feb. 5, 1942 |

OTHER REFERENCES

"Selsyns, etc.," Publication GEA-722B of The General Electric Co., Schenectady, N. Y., published September 1930 (6 pages, see page 3).